March 28, 1944.    K. K. NEWSOM    2,344,999
BOX CONSTRUCTION
Filed Jan. 26, 1938    3 Sheets-Sheet 1

INVENTOR.
Kitchener K. Newsom
BY Boyken & Mohler
ATTORNEYS

March 28, 1944.  K. K. NEWSOM  2,344,999
BOX CONSTRUCTION
Filed Jan. 26, 1938  3 Sheets-Sheet 2
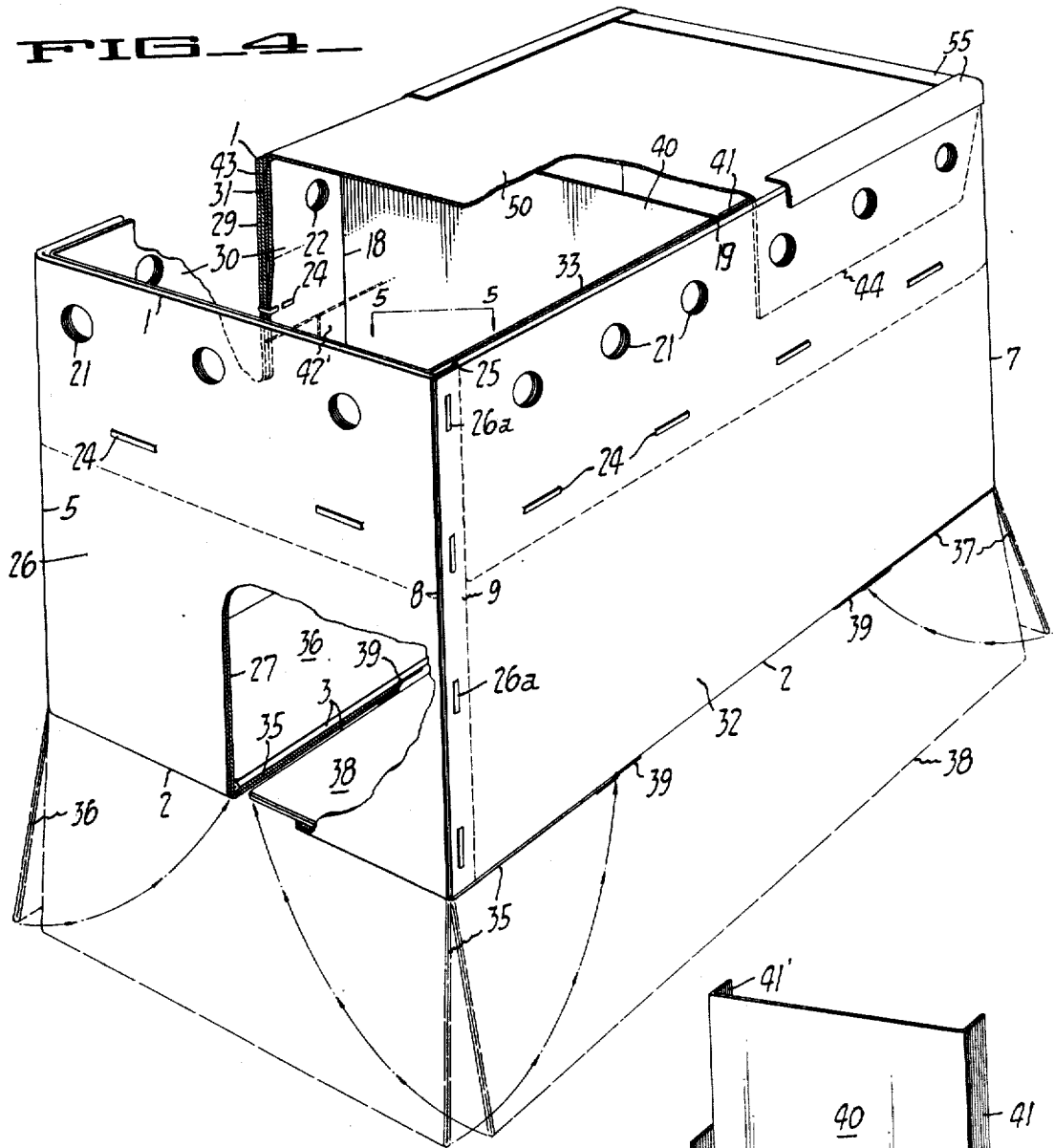
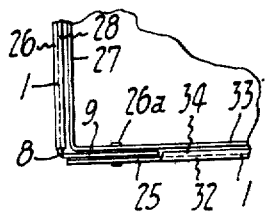
INVENTOR.
Kitchener K. Newsom
BY
Boyken & Mohler
ATTORNEYS March 28, 1944. K. K. NEWSOM 2,344,999
BOX CONSTRUCTION
Filed Jan. 26, 1938 3 Sheets-Sheet 3
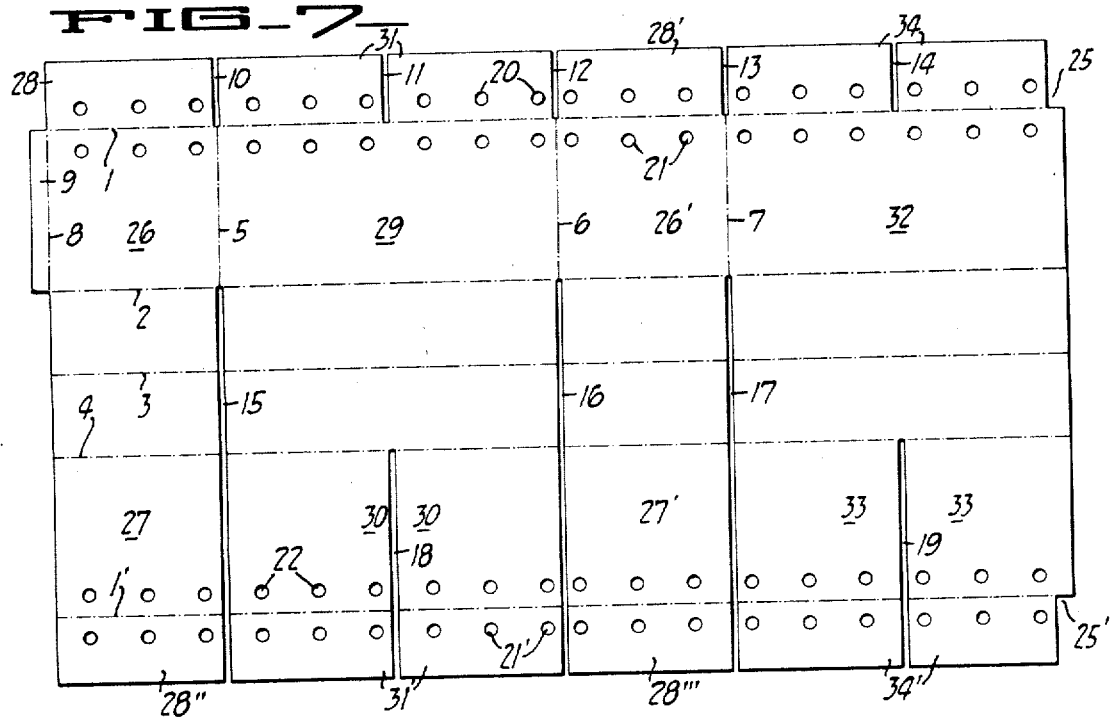
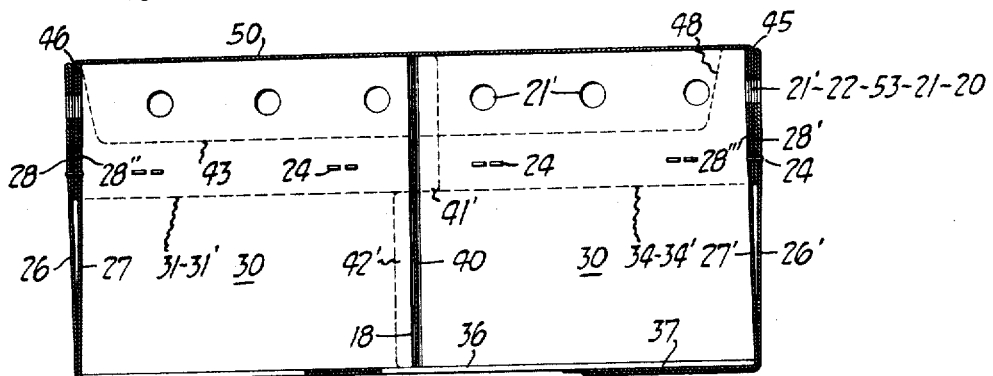
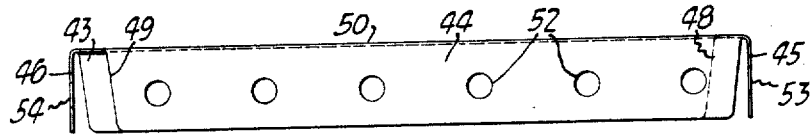
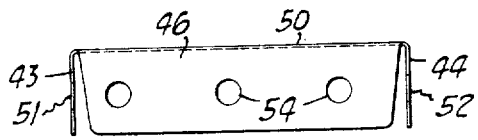
INVENTOR.
*Kitchener K. Newsom*
BY
*Boyken & Mohler*
ATTORNEYS Patented Mar. 28, 1944

2,344,999

UNITED STATES PATENT OFFICE 2,344,999

BOX CONSTRUCTION

Kitchener K. Newsom, San Francisco, Calif.

Application January 26, 1938, Serial No. 186,996

5 Claims. (Cl. 229—27).

This invention relates to box construction and has for its objects improvements in the provision of a strong, rigid, box of "fiberboard" or corrugated cardboard construction, which box is cheaper to manufacture than heretofore and in which box the side walls and bottom comprise a plurality of layers of cardboard of the corrugated type or otherwise arranged to cushion the contents against injury. Other objects are a box constructed to provide for ventilation or sealing as desired, without changing the structure, and in which box means is provided for readily partitioning the interior, and still further objects are a construction in which free edges of the box are sealed against detrimental ingress of moisture to within the cardboard and which box is collapsible to facilitate storage of empty boxes and shipment thereof. Other objects and advantages will appear in the specification and drawings annexed hereto.

In the drawings, Fig. 1 is a plan view of a blank of cardboard ready for folding to form a box and Figs. 2, 3 illustrate successive developments of the blank as it is folded.

Fig. 4 is a perspective view of a completely set-up box with a cover in place, portions of the cover and box walls being broken away and in section to more clearly illustrate the construction.

Fig. 5 is an enlarged plan view of one corner of the box, as seen from line 5—5 of Fig. 4.

Fig. 6 is a reduced perspective view of the central partition in the box of Fig. 4.

Fig. 7 is a plan view of a blank generally similar to that of Fig. 1, but slightly modified for a purpose later described.

Fig. 8 is an enlarged vertical sectional view taken a box folded from the blank of Fig. 7, the cover being shown on the box and a partition in place therein.

Fig. 9 is a side elevational view of the cover of both forms of boxes.

Fig. 10 is an end elevational view of the cover shown in Fig. 9.

In detail, in Figs. 1 to 3, the side walls and bottom of my box are formed from a substantially rectangular blank or sheet of corrugated cardboard or fiber board, and when the former is employed, the corrugations extend in a direction transversely of the length of the blank so that the side edges of the blank illustrated in Figs. 1, 2, as distinguished from the top and bottom edges, thereof, are cut longitudinally of the corrugations, and admission of moisture to between the opposed layers of paper or the like on opposite sides of the corrugated portion, would be at the ends of the corrugations.

Referring to Fig. 1, the sheet is creased longitudinally thereof along parallel, spaced lines 1, 2, 3, 4 that extend from end to end of the sheet. Crease 1 is disposed along one edge and parallel thereto, thus defining a marginal portion along said edge and crease 2 is spaced from crease 1 a distance substantially equal to the desired height of the side walls of the box. The spacing between creases 2, 3 and between 3, 4 are substantially equal, and which spacing respectively is substantially equal to one-half the distance between creases 1, 2. The distance between crease 4 and the edge of the sheet parallel therewith and adjacent thereto is substantially equal to the distance between creases 1, 2.

Disposed perpendicularly to creases 1 to 4, inclusive, the sheet of Fig. 1 is formed with parallel, spaced, successive creases 5, 6, 7 from the left of the sheet across that portion thereof lying between creases 1, 2, and the sheet is projected at one end of said portion adjacent crease 5 to form a relatively narrow marginal strip 8 projecting outwardly of one end edge of the sheet and a crease 8 parallel with crease 5 is formed in substantial alignment with said end edge defining the juncture of the projecting portion 8 and the body of that portion of the blank disposed between creases 1, 2.

The distance between creases 5, 6 and the distance between creases 6, 7 are substantially equal and respectively define the desired width of the box to be formed, while the distances, respectively, between creases 5, 6 and between crease 7 and the adjacent edge of the sheet parallel therewith, are equal and define the desired length of the box.

The marginal portion of the sheet disposed along crease 1 is formed with a row of parallel, spaced slots 10, 11, 12, 13, 14 successively disposed from left to right along said margin and which slots extend inwardly from the free edge of said portion to crease 1. Slots 10, 12, 13 extend outwardly of creases 5, 6, 7 respectively in longitudinal alignment therewith, and slots 11, 14 respectively are disposed substantially midway between slots 10, 12 and between slot 14 and the edge of the sheet adjacent to and parallel therewith.

The portion of the sheet extending from crease 2 toward the edge of the sheet outwardly of that portion lying between creases 1, 2 is formed with parallel, spaced slots 15, 16, 17, which slots extend inwardly from said edge to crease 2. Slots 15, 16, 17 respectively extend outwardly of and in longitudinal alignment with creases 5, 6, 7 and between slots 15, 16, and between slot 17 and the edge of the sheet parallel therewith and adjacent thereto, are slots 18, 19, which slots are parallel with slots 15 to 17 and are respectively disposed on lines in longitudinal extension of slots 11, 14. Slots 18, 19 extend from the same free edge of the sheet as do slots 15 to 17, but terminate at crease line 4.

Along opposite sides of crease 1 and parallel therewith and spaced therefrom are rows of openings 20, 21, and the free edge of the sheet remote from crease 1 has a row of similar openings 22. It is to be noted that the openings 20, 21 are positioned relatively to register with each other when the marginal portion having openings 20 therein is folded upwardly and over the portion of the sheet having openings 21, as illustrated in Fig. 2, and upon folding the portion outwardly of crease 3, to over the folded over marginal portion that has openings 20 therein, the openings 22 will register with openings 20, 21 as shown in Fig. 3.

Creases 1, 2, 3 are all formed to facilitate folding over of the portions on opposite sides of the creases respectively in the same direction, as described for creases 1, 3, but crease 4 is formed for folding of the portions adjacent opposite thereof in opposite directions, thus when the sheet is folded to the position illustrated in Fig. 3, the creases 2, 4 will be in alignment, one over the other, so that the overlying portions of the sheet on opposite sides of crease 3 will both tend to fold upwardly along overlying creases 2, 4.

After the sheet is folded to the position shown in Fig. 3, the overlying portions are stapled together by a row of staples 24 that are positioned below the rows of registering openings and relatively close to the free edge of the portion having openings 20 therein, all as best indicated in Fig. 3.

After the sheet is folded and stapled as indicated in Fig. 3, the end portion carrying strip 9 is brought upwardly and around to the opposite end, the transverse creases 5, 6, 7 being formed to facilitate "breaking" the stiffness of the sheet along said transverse creases, and the strip 9 will bend along crease 8 to fit against the end margin opposite said strip since the folded over margin carrying openings 20 is cut away as at 25 at said end margin to permit the strip to fit between the marginal overlying portions of the sheet at opposite sides of crease 3 between creases 1, 2 and between crease 4 and the free edge parallel with said latter crease respectively. The strip 9 is then stapled to the aforesaid overlying portions by staples 26a as best indicated in Figs. 4, 5.

From the foregoing and after the last step above described, it will be seen that the four sides of the box are formed, which sides are of double thickness over their entire areas, except where the marginal portion carrying openings 20 is disposed, and here the walls are of triple thickness.

One of the ends of the box comprises the panels 26, 27 of the sheet and marginal portion 28 the panel 27 being at one corner of the sheet bounded by the adjacent free edges thereof and crease 4 and slot 15, and the panel 26 being bounded by creases 1, 2, 5, 8, the marginal portion 28 being connected with panel 26 at crease 1 and said portion being otherwise free from the sheet to bend along said crease 1 to between panels 26, 27.

The opposite end of the box comprises panels 26', 27', and marginal portion 28'. Portion 28' is bounded by the free edge of the sheet; slots 12, 13 and crease 1. Panel 26' is bounded by creases 1, 2, 6, 7, and panel 27' is bounded by crease 4, slots 16, 17 and the free edge of the board.

Thus, the inner opposed sides of the opposite ends are panels 27, 27' and the opposite outer sides of the ends are panels 26, 26'.

One of the sides of the box connecting between the ends is made up of panels 29, 30, and marginal portion 31. The marginal portion 31 is divided by slot 11 intermediate its ends, and is bounded by the free edge of the sheet, slots 10, 12 and crease 1. Panel 29 is bounded by creases 1, 2, 5, 6. Panel 30 is divided by slot 18 and is bounded by the free edge of the sheet, slots 15, 16 and crease 4.

The other side of the box connecting between the ends is made up of panels 32, 33, and marginal portion 34. The marginal portion 34 is divided by slot 14 and is bounded by the adjacent free edges of sheet at the corner opposite portion 28, but along the same edge of the sheet, and by slot 13 and crease 1. Panel 32 is bounded by creases 1, 2, 7, and the free end edge of the sheet. Panel 33 is divided by slot 19 and is bounded by the adjacent free edges of the board at the corner opposite panel 27 and by crease 4 and slot 17.

Thus the inner opposed sides of the box, when folded, are panels 30, 33 and the outer sides of the box are panels 29, 32 and marginal portion 31 lies between panels 29, 30 while marginal portion 34 lies between panels 32, 33. It will also be seen that slots 15, 16, 17 in conjunction with creases 5, 6, 7 permit ready folding of the overlying panels to form the box sides, and slots 18, 19 will respectively register with slots 11, 14 to form vertical grooves in opposed relation at opposite sides of the box. Referring to Fig. 3, it will be seen that flaps 35, 36, 37, 38 respectively depend from overlying panels 26, 27; 29, 30; 26', 27'; and 32, 33, which flaps are each a double layer of the stock of the sheet connected together along crease 3, and each flap is adapted to swing inwardly toward the center of the box in overlying relation to form the bottom of the box when the box is folded as shown in Fig. 4.

The width of flaps 36, 38 determines whether or not there will be crack in the bottom of the box, and the width of the crack. If the combined width of the flaps is the width of the ends of the box, then the outer edges of the flaps will meet along the center and close the bottom, and flaps 35, 37 will fold over and below flaps 36, 38 at their opposite ends, while if the combined width of the flaps is less than the width of the ends, a crack will be provided in the bottom.

After the flaps 35 to 38 are folded to form the bottom as indicated in Fig. 4, they may be stapled together or secured in place by ordinary tape 39 extending across the ends of flaps 35, 37 and a tape may also be secured over the adjoining edges of flaps 36, 38 if desired.

A vertical partition 40 (Figs. 4, 6, 8) having oppositely bent marginal portions 41, 42 along one vertical edge and similarly bent marginal portions 41', 42' is adapted to slip into opposed slots 18, 19 on the inner opposed sides of the box with the marginal portions disposed between the panels forming the double side walls of each side of the box, thus securing the sides against outward bulging relatively, and the upper edges of the lower marginal portions 42, 42' of the partition will automatically engage below the free edges of the marginal portions 31, 34 as indicated in Fig. 4, to lock the partitions against vertical shifting, since the marginal portions 41, 41', 42, 42' are of cardboard or the like creased along the bends of said portions, whereby the tendency of the margins is to straighten out. Where it is desired to provide removable partitions, the marginal portions of the partition along the side edges are not divided, but are continuous, and may be bent to the same side, but are preferably bent to opposite sides of said partition.

The cover of the box is illustrated in Figs. 9, 10 wherein said cover is formed from a single piece of board creased along all four margins to form depending side flaps 43, 44 and depending end flaps 45, 46. The end flaps preferably have slanted end edges to facilitate positioning the flaps between the marginal portions 28, 28' of the sheet and the inside panels 27, 27' adjacent thereto, and the side flaps 43, 44 each have one end edge that is positioned at diagonally opposite corners of the cover cut at an incline, while the opposite end edges of said flaps respectively are cut away at 48 and 49 short of the corner of the top 50 of the box so as to permit clearing the corner of the box stapled together by staples 26a.

The flaps 43, 44, and 45, 46, are respectively provided with a row of openings 51, 52, 53, 54 which openings respectively, in one position of the cover, register with the registering openings 20, 21, 22 in the sides and ends of the box when the cover is tightly in position on the box, but the rows of openings 20, 21, 22 in the ends and sides of the box and the rows of openings in the flaps on the cover are horizontally positioned relative to the ends and sides of the box so that upon reversing the ends of the cover, the openings 51 to 54, inclusive, will be staggered relative to the openings in the box sides and ends to tightly seal the box.

This relationship between the rows of openings and the sides and ends of the box is best explained as follows:

As will be noted in Figs. 3, 4, when the box is folded, the openings in the opposite side walls are directly opposite to each other and the openings in the opposite end walls likewise are directly opposite to each other, but the rows of openings in the end walls commence at one of their ends closer to one of the side walls than the distance between the opposite ends of the rows and the side wall adjacent said opposite ends. Also the rows of openings in the side walls commence nearer one of the end walls than the distance between the opposite ends of the rows in said side walls and the end wall adjacent said opposite ends. Thus, since the openings in the flaps of the cover are disposed to be in register, in one position, with the openings in the side walls and end walls, when the cover is reversed, the openings in the flaps will lie between the openings in the end and side walls and the box will be sealed.

Referring to the bottom of the box, formed by flaps 35 to 38, inclusive, it is very important to note that with this construction, a bottom is provided that insures a very high protective cushion for the contents of the box since there are four layers of the cardboard at each end portion of the bottom, and the central portion of two layers of cardboard is supported above the floor or other supporting surface by the end flaps 35, 37. Where corrugated board is used, the cushioning effect is particularly high, and also in such construction, it will be seen that there are no open and exposed end edges on the flaps to permit ingress of moisture to the ends of the corrugated paper secured between the protective sheets on opposite sides of such corrugated paper or board, since the flaps are formed by folding the cardboard stock on itself along crease 3, which crease defines the end edges of the flaps.

Another important feature of the invention is the folding over of the marginal portions 28, 31, 28' and 34 so as to enclose the upper exposed edges of that portion of the sides and ends of the box that are outside the cover 50 and outside the flaps on said cover. Thus no moisture will be admitted to the interior of corrugated cardboard at said edges through exposed ends of corrugated paper stock.

In Figs. 7, 8 is illustrated a blank and box in which the panels of the sheet defining the inner sides of the box and the panels that define the outer sides of the box are provided with folded marginal portions at the upper edges of the box to protect said upper edges. Where the elements in Figs. 7, 8 correspond to the elements shown in Figs. 1 to 6, inclusive, they bear numerals similar to the numerals in the latter figures.

In Figs. 7, 8 instead of terminating the panels 27, 30, 27' and 33 in free edges, said panels are extended to form marginal portions 28'', 31', 28''', and 34' that correspond respectively to the marginal portions 28, 31, 28', and 34 along the opposite edge of the sheet, and crease line 1' between panels 27, 30, 27' and 33 and their extended marginal portions, as described, permits bending said marginal portions upwardly and over said panels with the result shown in Fig. 8 of bringing said marginal portions along opposite ends of the sheet adjacent each other, for receiving the flaps of the cover therebetween. The marginal portions 28'', 31' 28''' and 34' are provided with openings 21' which register with openings 22 when said marginal portions are folded over, thus providing for ventilation in the same manner as in Figs. 1 to 4 and staples 24 will secure the marginal portions at opposite ends of the sheet and the panels carrying said marginal portions, together. The outer end edge of marginal portion 34' is cut away at 25' for the same purpose as described.

Another advantage from folding over either one of the marginal portions of the sheet to form the upper edges of the sides, is the fact that this construction provides a resiliency to the panels forming the inner sides of the box since said panels are held apart at their upper ends from the panels forming the outer sides of the box, and thus the inner panels are free to slightly spring outwardly relative to the outer panel, and likewise shocks received against the outer panels are absorbed by said outer panels without affecting the inner panels against which the contents of the box are supported.

After the box is set up and the cover is in place, the flaps of the latter are concealed and the cover is supported on the upper edges of the panels forming the inside of the box, as clearly seen in Figs. 4, 8. Since the openings in the box ends and sides are spaced from the upper edge, strips of gummed tape 55 may readily be secured around the upper edges of the box, as seen in Fig. 4, to seal the cover in place, and partition 40 will centrally support the cover against being crushed inwardly as well as performing its function as a partition and securing the sides against outward bulging.

The provision of double thickness outside flaps 35, 37 below flaps 36, 38 at the bottom of the box insures ventilation between the adjacent free edges of flaps 36, 38 as is readily apparent from Figs. 4, 8 and when the box sides, ends of the strip shown in Fig. 3 are secured together by staples 26a (Fig. 4) it is apparent that the box, including the sides, ends and bottom may readily be collapsed to lie substantially flat and the cover and partition, likewise being adapted to fold flat, permit shipment of the complete boxes in a compact form ready for being quickly set up by the packer for filling.

The rigidity of the boxes when set up, is, to a large extent due to the fact that the widths of slots 15, 16, 17 respectively is such that the adjacent edges of the slots will come close together and will fit closely against the inside corners formed by the panels 26, 29, 26', 32.

While the boxes above described are particularly suitable for shipment of eggs instead of the conventional wooden boxes, it is obvious that the various proportions may be changed to adapt the boxes to other uses without departing from the invention. In any event, however, the boxes formed in accordance with my invention are much lighter and take up less space than ordinary wooden boxes having the same capacity, and my boxes afford greater protection to the contents thereof than where wood or other construction is employed, and there are no sharp edges to splinter or to become torn, and the boxes are neat and the sides or top readily adapt themselves to printing.

In the claims, where the words "fiber board" are used, this is intended to mean either plain or corrugated board of conventional construction unless otherwise specifically designated as "corrugated board," the latter term, when used, meaning corrugated board or paper stock comprising corrugated cardboard faces on opposite sides with paper stock.

I claim:

1. A substantially rectangular box having four side walls and a bottom, said side walls and said bottom being formed from a single sheet of fiber board, said bottom comprising extensions of the side walls, the extensions of the opposed side walls being folded toward each other with the extension of one pair of the opposed side walls below and overlying the extensions of the other pair of opposed side walls, each of said side walls comprising two layers of the material of said sheet and both layers of each of said side walls being extended to form said extensions respectively, whereby each of the extensions comprises two layers of the sheet material, and the layers forming each of said extensions being integrally connected together along the edges thereof opposite their connections with the layers forming the side walls.

2. A box formed of sheet fiber board material having four vertical side walls and a bottom and an open top, a vertical partition, guide means carried by two of the opposed side walls arranged and adapted to slidably receive the opposite edges of said vertical partition from the open side of the box for supporting said partition vertically between said opposed side walls, means carried by said partition adjacent said opposite edges thereof and means carried on said opposed side walls arranged and adapted to automatically engage each other in locking relation against withdrawal of the partition from the box when the partition is moved downwardly into the box a predetermined distance with said opposite edges in said guide means.

3. A substantially rectangular box having four side walls and a horizontal bottom wall formed from a single sheet of fiber board, said bottom wall including extensions on two opposed side walls of said box extending toward each other, each of said two opposed side walls and the extension thereon being double layers of said sheet in opposed relation joined integrally along the edge of the extension remote from the side wall carrying the same, the innermost layer of said two opposed side walls being formed with a vertical slot intermediate the other two side walls; each of said slots terminating at its lower end adjacent the upper layer of each of said extensions respectively, and a vertical partition in said box extending into said slots along its two opposite vertical edges; said slots opening upwardly and outwardly of said box at their upper ends to slidably receive the opposite vertical marginal portions of said partition through the upper ends of the slots for downward sliding of the partion in said slots into said box; and means formed integrally with each of said opposed side walls and with said partition respectively, automatically engaging each other in locking relation against withdrawal of said partition from said slots upon said partition being slipped into said slots a predetermined distance.

4. A box comprising two pairs of opposed, parallel, lateral side walls with one pair arranged at right angles to the other, and a bottom wall, said bottom wall being extensions of said opposed side walls bent toward each other and terminating in straight edges at opposite sides of a pair of planes respectively parallel with said pairs of side walls and bisecting each other centrally within said box, said side walls and said extensions being a double layer of fiber board formed from a single sheet of fiber board folded on itself along a fold line substantially coincident with said straight edges whereby each pair of layers of fiber board forming each lateral side and the extension therefrom are integrally connected together along the said terminating straight edge of each extension.

5. In a construction as defined in claim 4, the opposed, innermost adjacent layers of fiber board of one pair of said opposed side walls being each formed with a slot extending thereacross at right angles to the line of bend at the juncture between each side wall of said pair and the extension thereon, a substantially rectangular partition of sheet material within said box having two of its opposite edges within said slots, and the extensions of said side walls being free from each other for bending independently of each other along the juncture between each extension and the side wall from which it extends.

KITCHENER K. NEWSOM.